United States Patent
Acker

[15] 3,652,946
[45] Mar. 28, 1972

[54] COMPLEX ENVELOPE DETECTOR

[72] Inventor: William F. Acker, St. Petersburg, Fla.

[73] Assignee: Honeywell Inc., Minneapolis, Minn.

[22] Filed: July 2, 1970

[21] Appl. No.: 52,035

[52] U.S. Cl. ...........................329/192, 307/235, 328/133, 329/166, 329/205, 330/69
[51] Int. Cl. ..........................................................H03d 1/08
[58] Field of Search ................329/166, 192, 50, 205; 330/9, 330/109, 110, 69, 124; 328/50, 133; 307/232, 235

[56] References Cited

UNITED STATES PATENTS

| | | | |
|---|---|---|---|
| 3,526,786 | 9/1970 | Snyder | 330/69 X |
| 3,493,784 | 2/1970 | Brolin | 330/110 UX |
| 3,437,941 | 4/1969 | Leary | 329/192 |
| 3,308,287 | 3/1967 | Levy et al. | 328/133 X |
| 3,187,325 | 6/1965 | Waldhauer | 330/110 X |
| 3,390,281 | 6/1968 | Moses | 307/232 |
| 3,553,566 | 1/1971 | Nagy | 330/110 UX |

Primary Examiner—Alfred L. Brody
Attorney—Fred Jacob and Ronald T. Reiling

[57] ABSTRACT

A substantially phase insensitive complex envelope detector for continuously detecting on an analog basis the amplitude $R(t)$ of a time varying complex vector whose base-band voltage quadrature signals $x(t)$, $y(t)$ are of the form $R(t)=x(t)+jy(t)$. An approximation technique utilizes circuits which project the $x(t)$, $y(t)$ components parallel to vectors at angles $\theta_1$ through $\theta_n$, and summing circuits which combine these projections to give the approximate complex vector $\hat{R}(t)$. For a high order of $n$ angles the error of $\hat{R}(t)-R(t)$ is small.

17 Claims, 9 Drawing Figures

PATENTED MAR 28 1972 3,652,946

INVENTOR
WILLIAM FRED ACKER
BY Nicholas Prasinos

ATTORNEY

PATENTED MAR 28 1972 3,652,946

INVENTOR
WILLIAM FRED ACKER
BY Nicholas Prasinos
ATTORNEY

3,652,946

COMPLEX ENVELOPE DETECTOR

BACKGROUND OF THE INVENTION

The instant invention relates generally to a complex envelope detector and more particularly to rectifier and summing circuits for continuously tracking the magnitude R of a complex vector whose base-band quadrature signals $x$ and $y$ are of the form $R=x+j(y)$.

One way of detecting the envelope of a modulated signal is by utilizing an envelope detector well known in AM radio detectors whereby the signal is rectified and filtered through a low pass filter. This technique works well where we have a high carrier frequency; however, when frequencies down to and including DC are utilized the above technique is inadequate and results in missing a great deal of information.

In other signal tracking and processing loops the low frequency signal is converted to base-band (base-band is herein defined as a band of frequencies down to and including DC) by a double-balanced mixer. Two double-balanced mixers can generally be used working in quadrature with appropriate low-pass filtering so that two quadrature base-band signals are obtained. After further processing, the two signals can be combined and detected. If $x=R \cos \theta$ is the cosine quadrature component and $y=R \sin \theta$ is the sine quadrature component of a signal at carrier frequency $\omega_0$, where the random magnitude $R$ is defined as $$R = \sqrt{x^2+y^2}$$

and $\phi =$ random phase angle.

The composite signal is $C$, where:

$$C=(R \cos \phi)(\cos \omega_0 t)+(R \sin \phi)(\sin \omega_0 t)$$

which through further mathematical manipulation can be written as $$C= \sqrt{x^2+y^2} \cos(\omega_0 t - \phi)$$

Since the $\sqrt{x^2+y^2}$ component of the above equation varies slowly relative to $\cos(\omega_0 t - \phi)$ it may be thought of as the low frequency amplitude modulation of a high frequency carrier. Using the common AM detection technique of rectifying to shift the modulation to base-band, followed by low-pass filtering to remove the carrier, the modulation, $\sqrt{x^2+y^2}$, is recovered without sensitivity to carrier phase $\theta$.

Although this technique has the advantage of detecting the average magnitude of the complex vector, the hardware complexity and radiofrequency interference problems are sufficient reasons to utilize other circuits for approximately detecting the instantaneous value of the amplitude of the complex vector.

It is an object of the present invention to provide a relatively simple, inexpensive, reliable and accurate means for detecting the magnitude of a complex voltage signal on a continuous analog basis.

It is still a further object of the present invention to provide circuit means for detecting the approximate magnitude of a complex voltage signal on a continuous analog basis wherein the error between the solution by said circuit and an ideal solution is small.

SUMMARY OF THE INVENTION

The foregoing objects of the instant invention are attained by providing a substantially phase insensitive complex envelope detector for continuously detecting the magnitude r of a complex vector whose base-band voltage quadrature signals $x$ and $y$ respectively are of the form $$R= \sqrt{x^2+y^2}.$$

An approximation technique utilizes circuits which project the $x$ and $y$ electric analog components parallel to selected vectors at angles $\theta_1$ through $\theta_n$, and summing circuits which combine and produce a weighted average of the absolute values of these components to give a total approximate magnitude $R$ of the complex vector. The error difference between a solution by the instant invention and an ideal solution can be made to approach zero by increasing the number of the vectors at the different angles to which the projections are made.

BRIEF DESCRIPTION OF THE DRAWINGS

Other objects and advantages of the invention will become obvious from a consideration of the following description and the claims taken together with the accompanying drawings wherein:

DETAILED DESCRIPTION OF THE INVENTION

Figure 1:
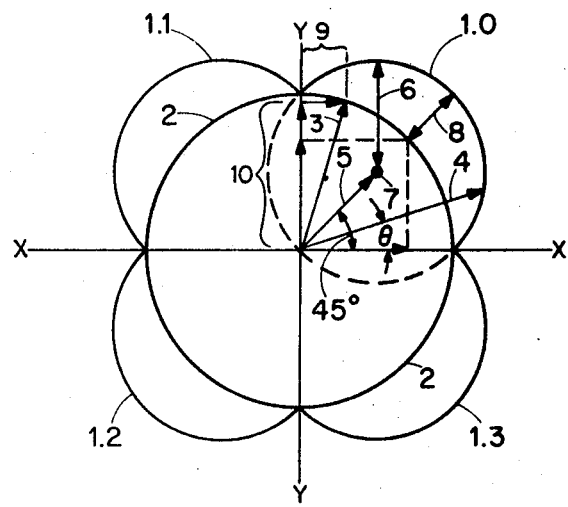
FIG. 1 represents a plot of graph in polar coordinates of $A$ vs. $\theta$ for a two-rectifier complex envelope detector, and a plot in polar coordinates for an ideal complex envelope detector.

FIG. 1 represents in polar coordinates the output of a two-rectifier complex envelope detector. It is utilized here to simplify the explanation of the principles on which the invention is based.

If A is used as the summing circuit output $$A= |x|+|y| \quad (1)$$

where
$|x|$ is the absolute value of $x$ and is equal to $|R \cos \theta|$ and
$|y|$ is the absolute value of $y$ and is equal to $|R \sin \theta|$.

Therefore by substitution $$A= |R \cos \theta|+|R \sin \theta| \quad (2)$$

and by normalizing $R$ to unity and restricting $\theta$ to the first quadrant $$A=\cos \theta+\sin \theta \quad (3)$$
$$A=\cos \theta+\cos(\theta-90°) \quad (4)$$
$$A=2 \cos \tfrac{1}{2}[\theta+(\theta-90°)] \cdot \cos \tfrac{1}{2}[\theta-(\theta-90°)] \quad (5)$$
$$A=2 \cos(\theta-45°) \cos 45° \quad (6)$$
$$A=1.414 \cos(\theta-45°)$$

for $0°<\theta<90°$. $\quad (7)$

It can be seen, therefore, that equation (7) is a circle 1.0 in FIG. 1 with its center 7 at $\theta=45°$ and radii 5 and 6 equal to 0.707. Similar equations and graphs can be derived for the other three quadrants which will result in circles 1.1, 1.2, and 1.3 having normalized radii of 0.707 at angles of 135°, 225°, and 315°, respectively. It will be observed in FIG. 1 that as the summer output $A$ sweeps counterclockwise from 0° to 360° its magnitude rises to a maximum value, and then falls to a minimum value output of summer. The maximum values of $A$ occur at $\theta=45°$, 135°, 225°, and 315° respectively. Its magnitude is equal to the sum of the absolute values of the $x$ component 9 of $R$ and the $y$ component 10 of $R$. By adding all the absolute values of $A$ thus obtained and dividing by $K$ an $R$ is obtained. When $K$ is defined according to the following relation:

$$K=\Sigma|\cos \theta_i| \text{ where}$$

$\theta_i=180°/n(i-1) \; i=1,2,...n.$
$R=$ approximate magnitude of the complex vector
In this case when $n=2, R=1, K=1, \hat{R}$ will be normalized to have a minimum value of unity.

Figure 2:
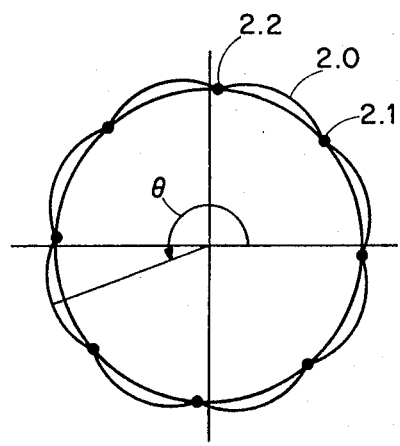
FIG. 2 represents a plot of a graph in polar coordinates of $A$ vs. $\theta$ for a four-rectifier complex envelope detector, and a plot in polar coordinates for an ideal complex envelope detector.

A mathematical formula for the error between $\hat{R}$ and $R$, has been developed as represented by the following equation:

$$1 \leq \hat{R}(t)/R(t) \leq \sec(90°)/n, \quad (8)$$

for any value of $\theta$
where $n$ = the number of rectifying circuits. From equation (8), it can be seen that the error between $R$ and $\hat{R}$ can be made smaller and smaller by increasing the number of rectifiers $n$. Hence, for a four-rectifier complex envelope detector, the plot of $\hat{R}/R$ vs. $\theta$ in FIG. 2 shows the error of $\hat{R}/R$ maximum at point 2.0 to $\hat{R}/R$ minimum at point 2.2 to be materially smaller than the error shown in FIG. 1 for a two-rectifier complex envelope detector. Carried to its ultimate conclusion, as we increase the number of rectifiers $n$ the error should become negligible. However, for a practical complex envelope detector a certain degree of error is acceptable and desirable as trade-off against simplicity and reliability of operation.

Hence, to implement this scheme, it is merely necessary to provide proper circuitry which projects the values of the $x$ and $y$ components of $R$ at given angles onto vectors at these given angles takes absolute values and provides summing and scaling circuitry for obtaining the sum and the weighted average of these projected values. The number of circuits provided is dependent on the trade-offs desired for accuracy verses complexity.

Figure 5:
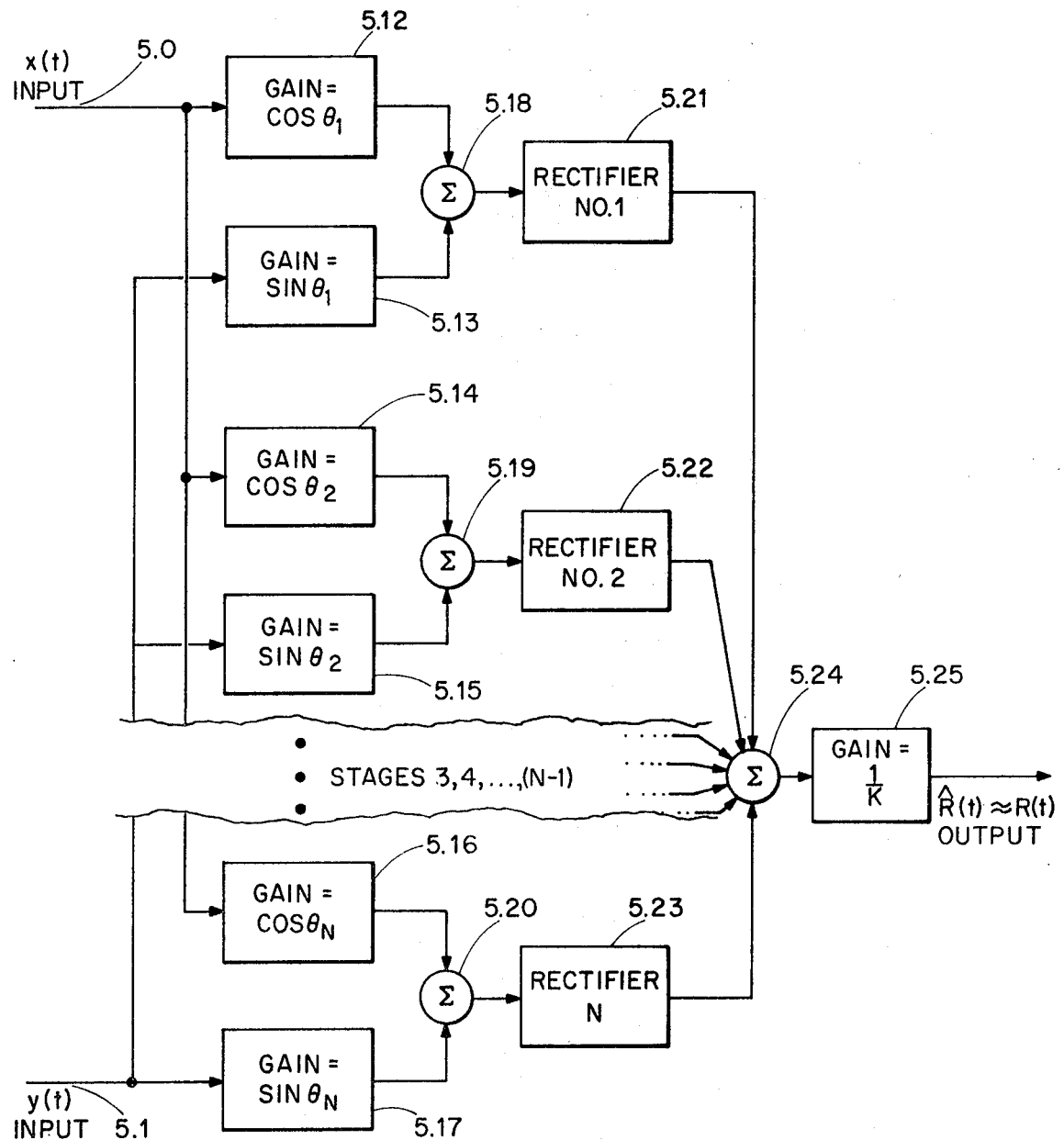
FIG. 5 is a block schematic diagram utilized in explaining the invention.

For a four-rectifier complex envelope detector the following formula holds:

$$A = |x \cos 0° + y \sin 0°| +$$
$$|x \cos(45°) + y \sin(45°)| +$$
$$|x \cos(90°) + y \sin(90°)| +$$
$$|x \cos(135°) + y \sin(135°)| + \quad (9)$$
$$\hat{R} = A/K \quad (10)$$

where $K$ is defined as before and $x$ and $y$ are input signals as shown in FIG. 5.

Figure 6:
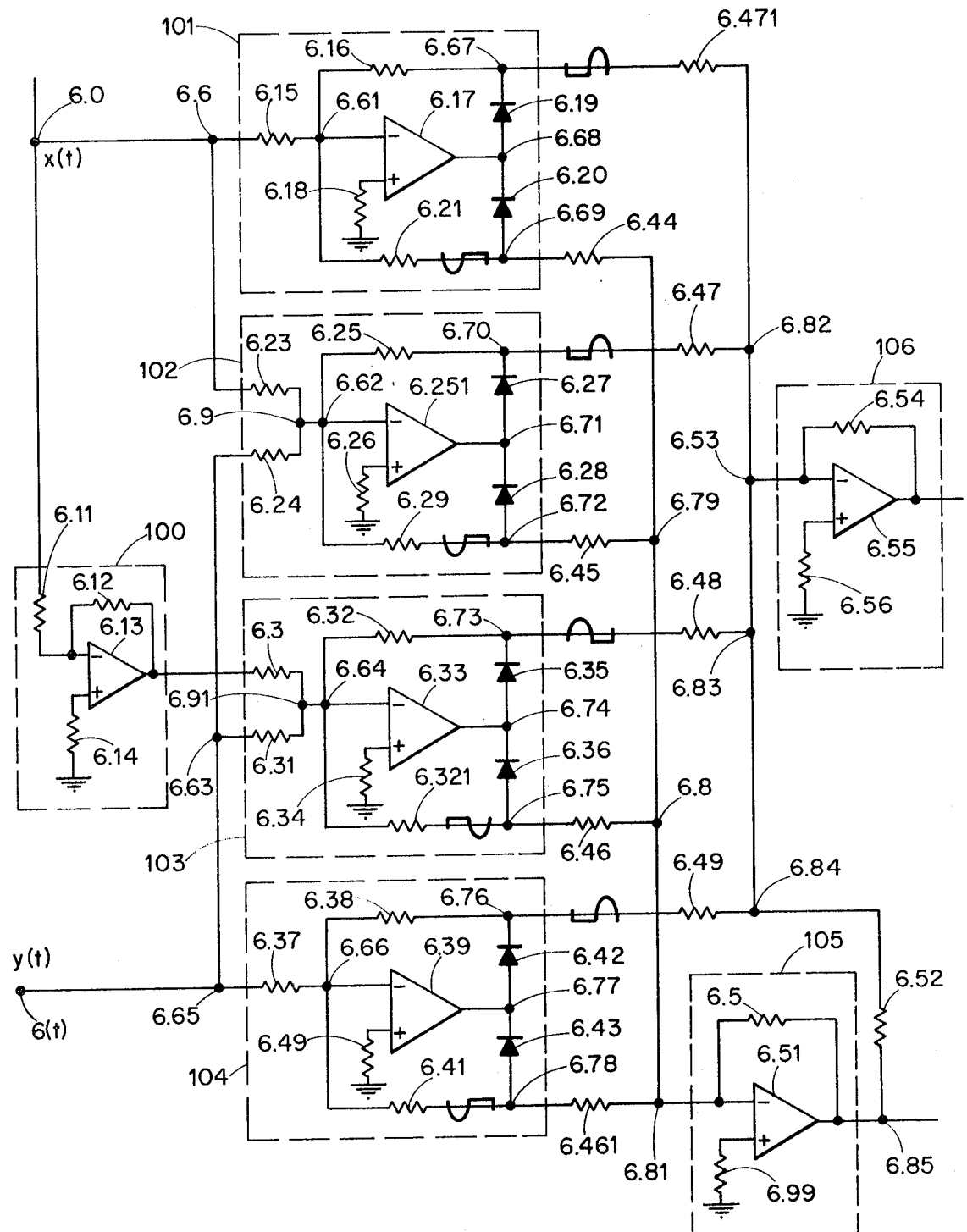
FIG. 6 is a schematic diagram of an embodiment of the invention utilizing four-rectifier circuits and seven operational amplifiers.

An embodiment of this scheme is shown in FIG. 6.

Figure 3:
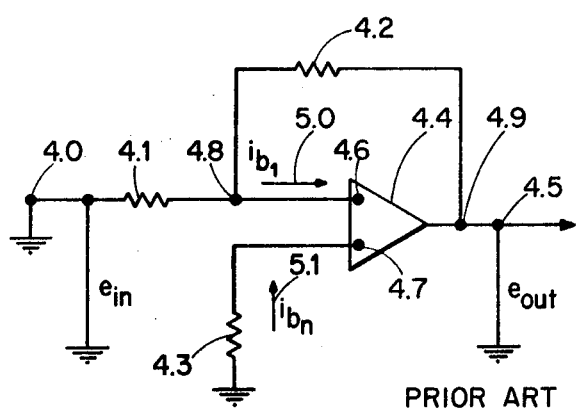
FIG. 3 is a schematic diagram of a prior art operational amplifier utilized in the invention and for simplifying the explanation of the invention.

FIG. 3 shows a schematic diagram of a prior art operational amplifier. Such amplifiers are described in the Amplifier Handbook by Richard F. Shea, Editor-in-Chief, published by McGraw-Hill Book Company, pgs. 19–1 through 19–38. Since the embodiments of the invention require a multiplicity of these devices as building blocks, FIG. 3 is presented and discussed to facilitate later description of the embodiments and avoid confusion and redundancy. In FIG. 3, an active electron discharge device 4.4 such as a tube, transistor, or other similar device is provided with an input signal circuit comprising an input impedance element 4.1 (such as for example a resistor) and coupled to the inverting input terminal 4.6 of the device through a summing junction 4.8. A feedback circuit is coupled to the input side 4.8 of the device to a feedback impedance element 4.2 and again coupled to the output side 4.9 of the device. The gain of this amplifier circuit depends only on the ratio of the feedback to the input impedance and if we call $R_f$ the feedback impedance, $R_i$ the input impedance, and $G$ the closed loop gain of the amplifier then:

$$G = -R_f/R_i. \quad (11)$$

The minus sign in this equation indicates that an input signal is inverted at its output. For proper and accurate operation of this amplifier circuit, the effect of the bias current 5.0 on the output voltage should approach 0; hence, compensating resistor 4.3 is selected to make $e_{out}$ equal to zero when bias current ($i_{b1}$) 5.0 is equal to bias current ($i_{b2}$) 5.1.

This circuit has the ability to multiply an input voltage signal by the gain so the output is a multiplied result of the input. The gain may be selected to be the cosine or the sine of any given angle $\theta$, and when this is done, the circuit has effectively projected the $x$ component or the $y$ component (depending on the gain chosen) onto a line at a given angle $\theta$ by simple trignometric arithmetic.

Figure 4:
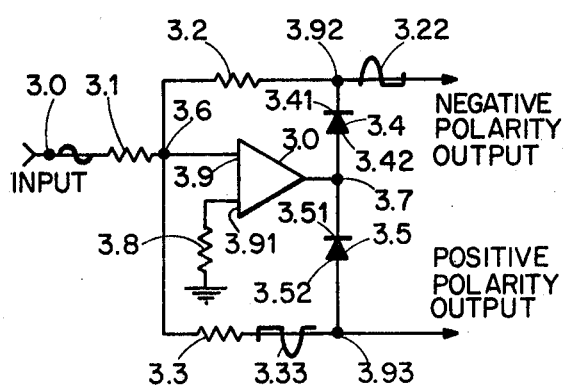
FIG. 4 is a schematic diagram of rectifier circuit utilized in the invention.

FIG. 4 shows schematically another basic building block of the embodiment of the invention in the form of a half-wave rectifier. An operational amplifier 3.0 is provided with an input circuit through an input impedance element 3.1 whose output is coupled to negative terminal 3.9 of the operational amplifier through a summing junction 3.6. Again, a feedback circuit is coupled from an output junction 3.7 through a diode 3.4 and through a feedback impedance element 3.2 to the summing junction 3.6. A similar feedback circuit is provided on the opposite side of the electron discharge device 3.0 through diode 3.5 and feedback impedance 3.3.

In operation, when the input to the amplifier 3.0 is a negative voltage signal, the voltage at the output 3.7 is positive, and biases the anode 3.42 of diode 3.4 positive and the cathode 3.51 of diode 3.5 positive, and since the cathode 3.41 of diode 3.4 is negative and the anode 3.52 of diode 3.5 is negative, diode 3.4 is in the forward or conducting state and passes the positive signal whereas diode 3.5 is in the negative or non-conducting state and shows a high impedance to the positive signal. Therefore, a positive voltage signal 3.22 will be passed by diode 3.4 and appear at point 3.92. For a positive voltage signal at the input 3.0 the reverse holds true and a negative voltage signal 3.33 appears on the lower feedback circuit in the region of 3.93.

In the block schematic diagram of FIG. 5, $x(t)$ 5.0 and $y(t)$ 5.1 are quadrature components of a signal $R(t)$ (not shown) whose magnitude we want at any given time ($t$). By feeding one each of the quadrature components into the amplifiers 5.12, 5.13, etc. of the type shown in FIG. 3 above and having preselected gains of $\cos \theta_n$ and $\sin \theta_n$ the components $x(t) \cos \theta_n$ and $y(t) \sin \theta_n$ result. By adding these components at summing points 5.18, 5.19, etc., we have projected these components on lines at given angles $\theta_n$. The various signals representing the projecting of $x$, and $y$ on these vectors at $\theta_1$, $\theta_2$,... through $\theta_n$ are further processed through rectifier circuits 5.21, 5.22, etc. The sum of the absolute voltage magnitudes of these $n$ different vector signals appear at the summing junction 5.24. In amplifier 5.25, this sum is divided by the normalizing constant $K$ where:

$$(12) \quad K = \sum_{i=1}^{N} |\cos \theta_i|$$

where
$\theta_i = 180°/N(i-1)$,
$i = 1, 2,...N$.

The output of the amplifier 5.25 is the approximate value $\hat{R}(t)$ of the true value of the complex vector $R(t)$.

FIGS. 6–9 are embodiments representing the above principle of the invention. In FIG. 6 is shown four rectifier circuits generally denoted 101, 102, 103, 104, having quadrature component voltage signals $x(t)$, $y(t)$ coupled to the inputs 6.61, 6.9, 6.91, and 6.66 of the rectifier circuits respectively. The rectifier circuits are similar to those previously described and illustrated on FIG. 4; rectifier circuits 101 and 104 are identical to FIG. 4 whereas rectifier circuits 102 and 103 differ slightly in that the input circuit of each has two resistors 6.23, 6.24, and 6.3 and 6.31 respectively. The pairs of input resistors project $x(t)$ and $y(t)$ onto lines at angles of 45° and 135°, whereas the input signals to rectifier circuits 101 and 104 are projected onto lines at 0° and 90° respectively. Because the sine of 0° and cosine of 90° are zero, only one input apiece is needed for these two rectifier circuits. The amplifying circuit generally denoted 100 is similar to the circuit of FIG. 4 and has a gain of −1; its sole function is to invert the $x(t)$ component providing a $y-x$ vector at the input summing junction 6.91 of rectifier 103. No inverting amplifier is present on the input of rectifier circuit 102, so that an $x+y$ vector is obtained at the summing junction 6.62. Hence, at the outputs 6.68, 6.71, 6.74, 6.77 of the respective circuits 101, 102, 103, 104, there appear voltage analogs of $x$, $x+y$, $y-x$, and $y$ vectors respectively. The positive signals of these outputs are summed by the summing circuit represented by impedances 6.471, 6.47, 6.48, and 6.49 respectively at the common summing junction 6.53. The negative output signals of the rectifier circuits are inverted by amplifier circuits generally denoted 105 which is also similar to the circuit of FIG. 3, and applied through impedance 6.52 to summing junction 6.53. Finally, the summing point 6.53 feeds an amplifier circuit generally denoted 106 again similar to FIG. 3 which by proper choice of gain provides an analog voltage signal representing the magnitude of the complex vector we seek. The four-rectifier complex envelope detector embodiment of FIG. 6 performs its function by solving equation (9) above, and requires the proper gain for the various amplifiers in the circuits which is provided by selecting the proper impedance values. Typical impedance values for the embodiment of FIG. 6 are given in Table I below:

TABLE I

| Impedance value in kilohms | 8.45 | 5.62 | 4.02 | 7.5 | 31.6 | 4.22 | 2 | 13 | 1.5 |
|---|---|---|---|---|---|---|---|---|---|
| Impedance Number on figure 6 with above impedance value. | 6.12, 6.16 | 6.24 | 6.25 | 6.44 | 6.471 | 6.18 | 6.26 | 6.54 | 6.99 |
| | 6.21, 6.37 | 6.3 | 6.29 | 6.45 | 6.47 | 6.49 | 6.34 | | |
| | 6.38, 6.41 | 6.31 | 6.32 | 6.46 | 6.48 | 6.14 | | | |
| | 6.11, 6.15 | 6.23 | 6.321 | 6.461 | 6.49 | 6.56 | | | |
| | | | | 6.5 | 6.52 | | | | |

Figure 7:
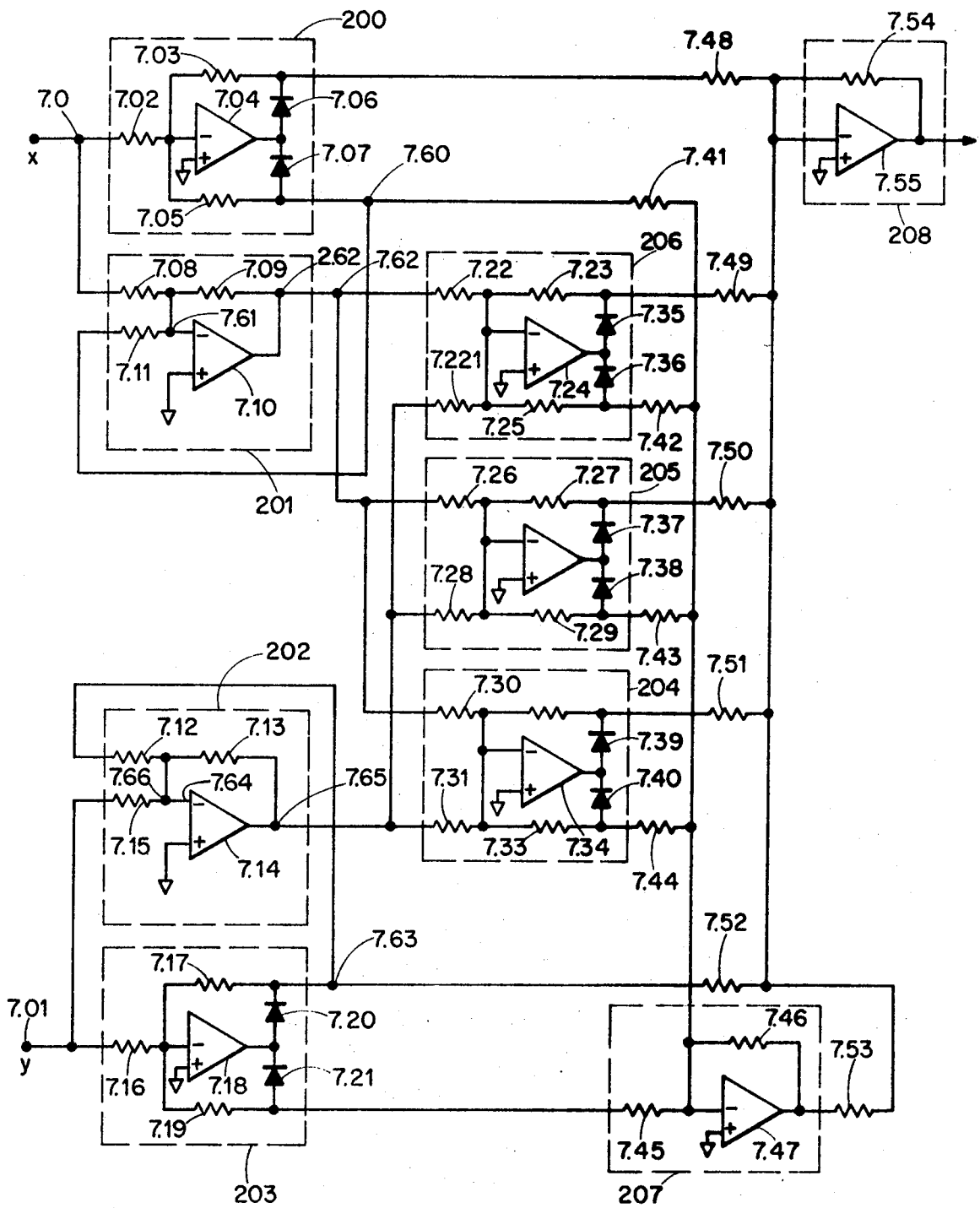
FIG. 7 is a schematic diagram of another embodiment of the invention utilizing nine operational amplifiers.

In the embodiment of FIG. 7 greater accuracy is obtained by projecting the x and y input components onto axes or vectors at eight angles to reduce the ripple error of the summing point vector A as previously discussed. In the embodiment of FIG. 6, the x and y vectors are projected onto vectors at 0°, 45°, 135°, and 90° by circuits 101, 102, 103, and 104 respectively. In the embodiment of FIG. 7, the x and y vectors of the input are projected onto vectors at 0°, 22½°, 45°, 67½°, 90°, −22½°, −45°, and −67½°, a total of eight angles. Circuits 200, and 201 project the incoming signal onto the 90° vector; circuits 202, and 203 project onto the 0° vector; circuits 204, 205, and 206 project on the −22½°, −45°, and −67½° vectors respectively. In FIG. 7 there are no discrete circuits specifically designated to project onto vectors at angles of +22½°, +45°, and +67½°; this task is accomplished by circuits 200 and 201 cooperating with circuits 202 and 203 to add their outputs through summing resistors 7.48, 7.41, 7.45, and 7.52 to obtain these angles respectively. Hence, with nine operational amplifiers, two more than the embodiment of FIG. 6, the x and y signal can be projected onto vectors having eight different angles.

In FIG. 7, the basic building block structures of FIG. 4 will be recognized in circuits 200, 203, 204, 205, and 206, and the basic building block structures of FIG. 3 in circuits 201, 202, 207, and 208. However, in FIG. 7, a modification has been made in that half-wave rectifier circuit 200 has been combined with inverting operational amplifier 201 by adding the negative signal of rectifier circuit 200 at double gain at output 7.60 with the input signal of the x vector, said signal being a unity gain, and feeding the result to the negative terminals 7.61 of operational amplifier 7.10 obtaining a positive full-wave rectified signal at the output 7.62. Similarly, a full-wave negative rectified signal is obtained at the output 7.65 by taking a double gain signal from the positive output 7.63 of half-wave rectifier circuit 203 and adding it with a single gain input signal at junction 7.66 and feeding it to the negative terminal 7.64 of operational amplifier 7.14 which inverts the positive signal to obtain full-wave negative rectification. The rationale here is that if a signal of a plus magnitude of two is added to a signal of a minus magnitude of one, a signal of a plus magnitude of one will result. The preceding phenomenon occurs during times when the half-wave rectifier is positive. When the half-wave rectifier output is 0, the unity gain input signal already has the correct positive polarity and amplitude. The full-wave rectified outputs obtained above are each fed into the inputs of circuits 204, 205, and 206, which project these x and y signals onto vectors at angles of −22.5°, −45°, and −67½°. (See FIG. 5) The rectifiers provide positive signals to summing resistors 7.49, 7.50, and 7.51; and negative signals to resistors 7.42, 7.43, and 7.44, which are then fed to an inverting amplifier circuit 207, FIG. 7 to obtain a positive output. Also, positive outputs are provided by circuits 200 and 203 to resistors 7.48 and 7.52 respectively; and negative outputs are provided by these circuits to resistors 7.41 and 7.45, again feeding inverting amplifier 207. Finally, all values feeding into summing amplifier 208 are positive and by properly selecting the gain of operational amplifier circuit 7.55 a weighted average results, which gives the quantity $\hat{R}(t)$, which is the approximate solution for the magnitude of the complex vector R at a given time t. As equation (8) states, this approximate quantity $\hat{R}$ is more accurate than that obtained from the embodiment of FIG. 6.

Typical values of resistors for FIG. 7 are summarized in Table II below:

TABLE II

| Impedance value in kilohms | 10.00 | 20.00 | 3.16 | 4.42 | 75 | 24.9 | 15 | 3.4 | 8.25 |
|---|---|---|---|---|---|---|---|---|---|
| Impedance Number on Figure 7 with above impedance value. | 7.02 | 7.08 | 7.23 | 7.26 | 7.42 | 7.41 | 7.46 | 7.22 | 7.221 |
| | 7.11 | 7.09 | 7.25 | 7.28 | 7.43 | 7.45 | 7.53 | 7.31 | 7.30 |
| | 7.12 | 7.13 | 7.27 | | 7.44 | 7.48 | 7.54 | | |
| | 7.16 | 7.15 | 7.29 | | 7.49 | 7.52 | | | |
| | 7.03 | | 7.32 | | 7.50 | | | | |
| | 7.05 | | 7.33 | | 7.51 | | | | |
| | 7.17 | | | | | | | | |
| | 7.19 | | | | | | | | |

Properly selected resistors included in the paths from the non-inverting amplifier inputs can be used to minimize the effect of bias current for the output of the circuit.

Figure 8:
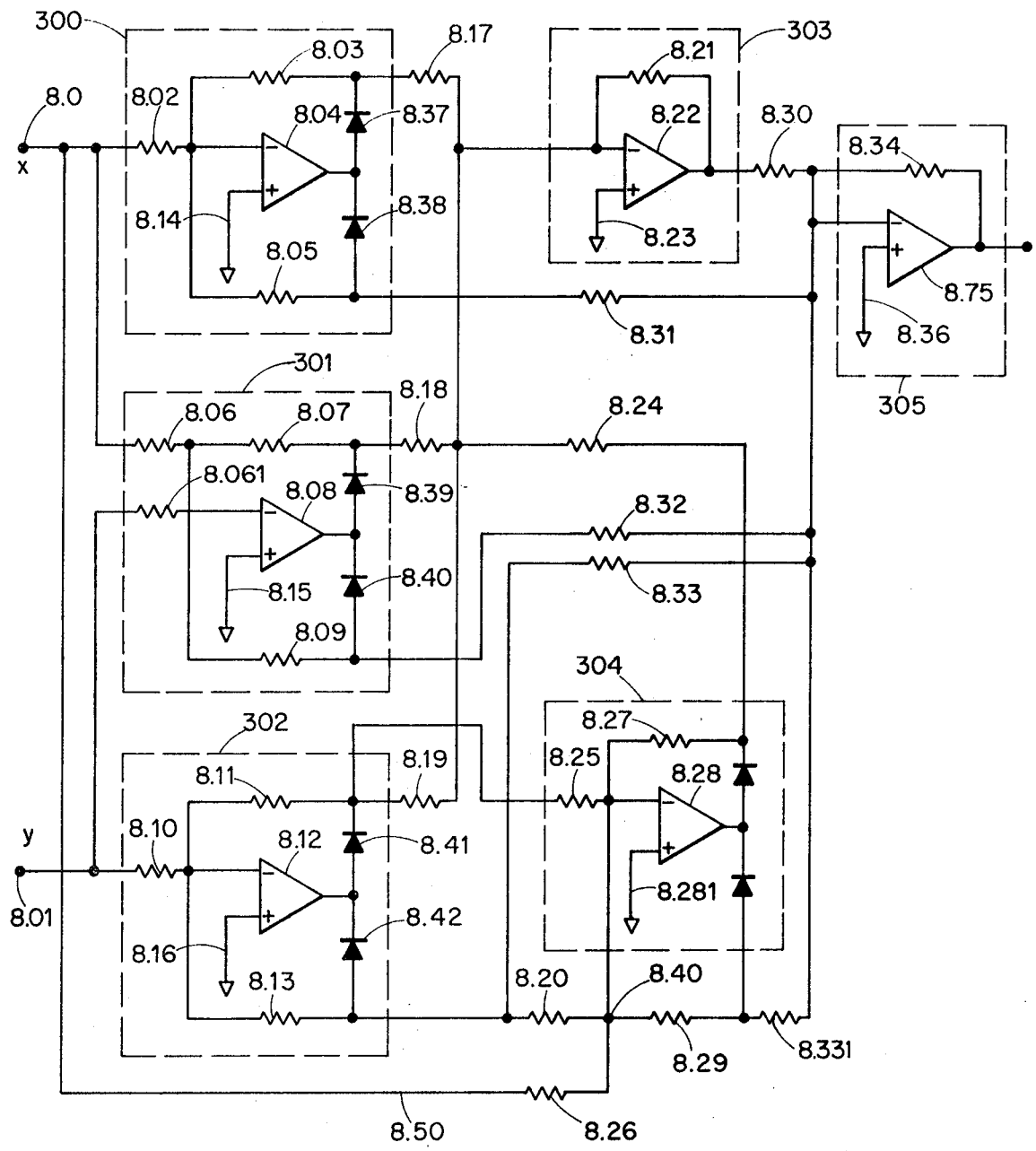
FIG. 8 is a schematic diagram of still another embodiment of the invention utilizing six operational amplifiers; and, FIG. 9 is a schematic diagram of yet another embodiment of the invention utilizing four operational amplifiers.

The embodiments of FIG. 8 is similar to the embodiment of FIG. 6 in that the x and y voltage signals are projected onto vectors having angles of 0°, 45°, 90°, and 135° respectively. However, the embodiment of FIG. 8 uses one less operational amplifier. This is accomplished by eliminating the inverting amplifier 100 of FIG. 6 feeding the required minus y input to the 135° rectifier circuit 103 of FIG. 6. A minus y input is still required by the 135° circuit 304 of FIG. 8, and this is obtained by utilizing the outputs of amplifier circuit 302. When the input y is positive, diode 8.42 of amplifier circuit 302 will conduct, transmitting a negative input signal to amplifier circuit 304, through resistor 8.20. When y is negative, diode 8.41 transmits a positive input to amplifier 304 through 8.25. Thus, outputs of circuit 302 are utilized to supply a minus y input to circuit 304.

The remainder of FIG. 8 is much like FIG. 6. Circuits 300, 301, and 302 project incoming signals onto 0°, 45°, and 90° vectors respectively and supply half-wave rectified outputs for these, and of course circuit 304 projects incoming signals onto 135° vector. The positive outputs of circuits 300, 301, 302, and 304 are fed into an inverting amplifying circuit 303 and then to the summing amplifier 305; whereas the negative outputs from these circuits are fed into the summing amplifying circuit 305 directly to give the magnitude $\hat{R}(t)$.

Typical resistors to provide proper gain, summing and averaging for this embodiment are given in Table III below:

TABLE III

| Impedance Value In Kilohms | 10.00 | 14.14 | 24.14 |
|---|---|---|---|
| Impedance Number on FIG. 8 with above Impedance Value | 8.02, 8.10 8.21, 8.27 8.29, 8.30 8.34, 8.03 8.05, 8.07 8.09, 8.11 8.13 | 8.06 8.061 8.20 8.25 8.26 | 8.17, 8.18 8.19, 8.24 8.31, 8.32 8.33, 8.331 |

Again, properly selected resistors can be included in the paths from the non-inverting amplifier inputs to ground to minimize the effects of bias current.

Figure 9:
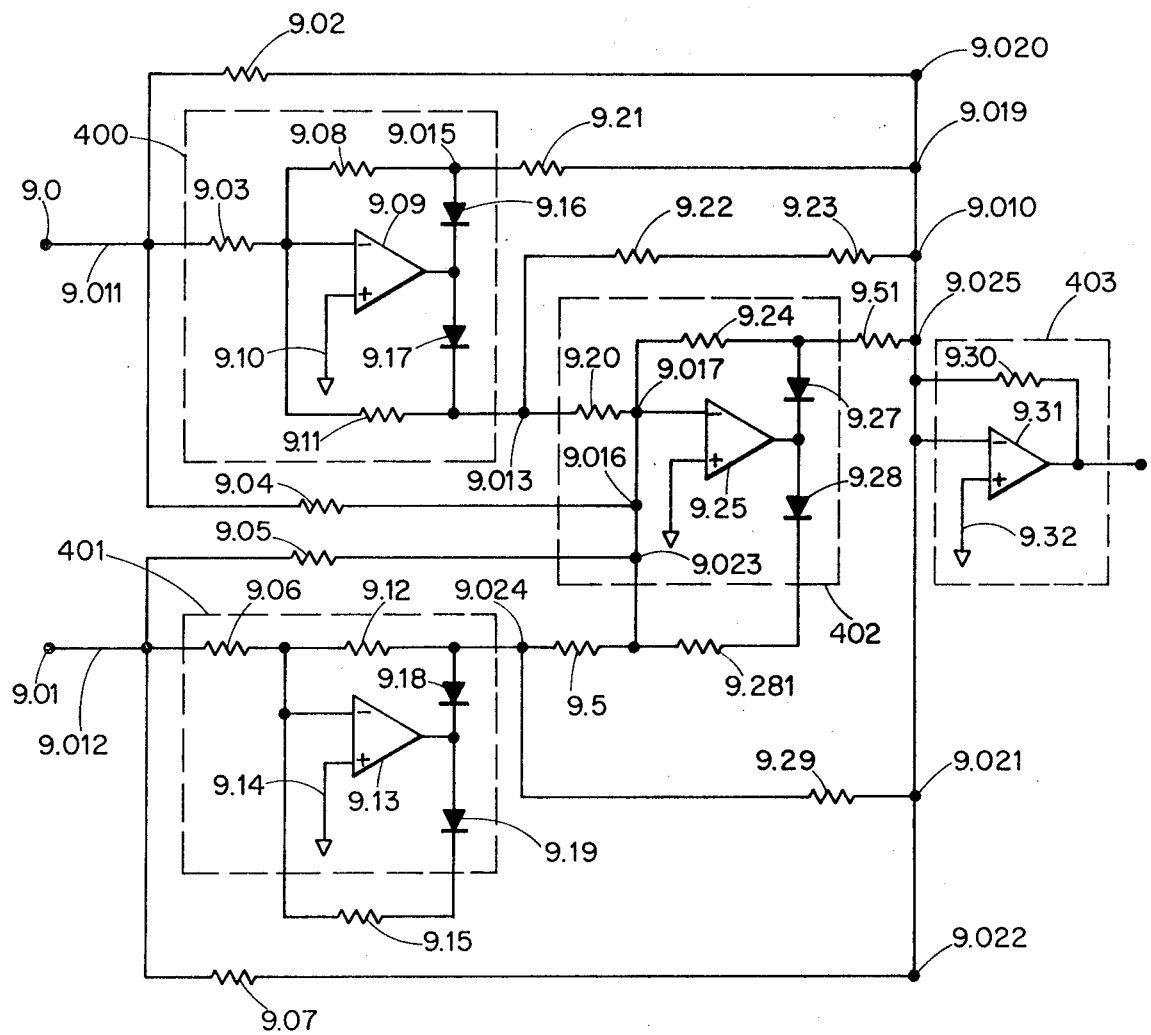

The embodiment of FIG. 9 projects the incoming $x$ and $y$ voltage signals onto vectors at 0°, 45°, 90°, and 135° respectively, then sums them up and obtains their weighted average. In this respect, it is similar to the embodiment of FIGS. 6 and 8 but only four operational amplifiers are utilized to project onto the same four angles 0°, 45°, 90°, and 135°. This is accomplished by having all the rectifier circuits do double duty using all the features heretofore illustrated separately in previous circuits. Briefly, the following features of the invention have enabled us to economize on hardware:

A. all or any of the angles between 0° and 90° can be formed by adding parts of 0° and 90°, thus, for example, eliminating the need for an extra circuit or circuits, and specifically eliminating the 45° rectifying circuit from the embodiment of FIG. 9;

B. the output of 0° and 90° rectifier circuits are further used to form the $x$ minus $y$ inputs, thus eliminating the inverting amplifier previously utilized to invert $y$;

C. obtaining a full-wave rectified signal from the output of a half-wave rectifier by including a resistor around one of the half-wave rectifiers so that the combination of resistor and half of the rectifier output gives a full-wave rectified effect, thus eliminating a final inverting amplifier for the negative portion of the half-wave rectifiers.

In FIG. 9, the $x$ and $y$ voltage signals are introduced at inputs 9.0 and 9.01 respectively. The $x$ input line 9.011 connects through three resistors in parallel 9.02, 9.03, and 9.04 respectively. The output of resistor 9.02 feeds directly to the input of circuit 403 at 9.9020 and forms part of a full-wave rectifier circuit. Input resistor 9.03 connected to input operational amplifier 9.09 drives operational amplifier 9.09; the ratio of feedback resistors 9.08 and 9.11 to input resistor 9.03 also provides unity gain for operational amplifier circuit 9.09. The output of resistor 9.04 is connected to the input of operational amplifier 9.25 at point 9.016 and is utilized together with the lower output of amplifier 9.09 at point 9.013 also connected through resistor 9.20 to the input of amplifier 9.25 at point 9.017 to give a full-wave positive absolute value of $x$ input to operational amplifier 9.25. The lower output of amplifier 9.09 shown at 9.013 also divides at the point 9.013 and is connected through series resistors 9.22 and 9.23 to the input of operational amplifier 9.31 at point 9.010. The upper output of amplifier 9.09 is connected through resistor 9.21 to the input of operational amplifier 9.31 at point 9.019. These inputs at points 9.010, 9.019, and 9.020 to operational amplifier 9.31 give a full-wave rectified input to operational amplifier 9.31 which generates all of the 0° and the $x$ portion of the 45° output.

The bottom half of the circuit on FIG. 9 performs substantially the same functions for the $y$ input. The $y$ input signal is fed by a line 9.012 to three resistors in parallel 9.05, 9.06, and 9.07 respectively. Resistor 9.06 drives operational amplifier 9.13 and the output of resistor 9.05 feeds the input of operational amplifier 9.25 at point 9.023. Resistor 9.29 feeds from the output 9.024 of the upper half of the operational amplifier 9.13 to the input of operational amplifier 9.31 at point 9.021. Resistors 9.07 and 9.29 taken in parallel give a full-wave rectified value of $y$. They generate all of the 90° input and the $y$ portion of the 45° input to operational amplifier 9.31. Also resistors 9.05 and 9.5 combined in parallel and feeding the input of operational amplifier 9.25 give minus the absolute value of $y$. Finally, resistor 9.51 in series with the output of operational amplifier 9.25 feeds the 135° signal to operational amplifier 9.31 at point 9.025. Again, operational amplifier circuit 403 is as before the summing and averaging circuit to give the desired result.

Typical values for resistors for the embodiment of FIG. 9 are summarized in Table IV below:

TABLE IV

| Impedance Value In Kilohms | 10.00 | 5.00 | 7.07 | 11.00 | 6.04 | 12.1 |
|---|---|---|---|---|---|---|
| Impedance Number on FIG. 9 with above Impedance Value | 9.02, 9.03, 9.04, 9.05, 9.06, 9.07, 9.08, 9.11, 9.12, 9.15, 9.30 | 9.20 9.5 9.29 | 9.21 9.24 9.281 | 9.22 | 9.23 | 9.51 |

Table V below illustrates the accuracy of the embodiment of FIG. 9 by comparing the theoretical vs. the actual outputs for given input signals:

TABLE V

| Input in Volts DC | | Output in Volts DC | |
|---|---|---|---|
| $x$ | $y$ | Theoretical | Actual |
| 0 | 0 | 0 | 0.006 |
| 1 | 0 | +1.0 | 0.995 |
| 1 | 1 | +1.414 | 1.4343 |
| 0 | 1 | +1.0 | 0.9881 |
| −1 | 1 | +1.414 | 1.4086 |
| −1 | 0 | +1.0 | 0.9950 |
| −1 | −1 | +1.414 | 1.4155 |
| 0 | −1 | +1.0 | 1.005 |
| 0 | −1 | +1.414 | 1.4262 |

While the principles of the invention have been made clear in the illustrated embodiments, it will be obvious to those skilled in the art that many modifications in structure, arrangement, elements, materials, and components may be used in the practice of the invention and other wise without departing from the spirit of invention as set forth in the appended claims.

Having now described the invention, what is claimed as new and novel and which it is desired to secure by Letters Patent is:

1. A complex envelope detector for calculating on a continuous analog basis the amplitude of a time varying complex voltage vector comprising, electric circuit means for conducting electric signals, a plurality of input means coupled to said circuit means for introducing electric signals to said circuit means, a plurality of translating means coupled to said circuit means for projecting the analog values of the electric signals onto vectors at preselected angles, a plurality of rectifying circuit means coupled to said translating means for rectifying the signals, summing amplifier means coupled to said rectifying circuit means for summing the absolute analog values of the projected signals said summing means including averaging means for obtaining the weighted average of the summed analog values of the projected signals, and output means coupled to said summing amplifier means for abstracting the averaged analog signal from said summing amplifier means.

2. A complex envelope detector as recited in claim 1 wherein said translating means comprise first operational amplifier means.

3. A complex envelope detector as recited in claim 3 wherein said first operational amplifier means include feedback impedance means and input impedance means, the ratio of the value of said feedback impedance means to said input impedance means selected to provide gain for said first operational amplifier means operable to multiply an incoming voltage signal to said first operational amplifier means by a preselected magnitude.

4. A complex envelope detector as recited in claim 3 wherein the preselected multiplier magnitude is the cosine of the angle of said preselected vector.

5. A complex envelope detector as recited in claim 1 wherein said rectifier means comprise a first subcircuit coupled to said first operational amplifier said first subcircuit having first impedance elements and first rectifier elements in series, operable to pass a voltage signal of a given polarity and restrict a voltage signal of the opposite polarity.

6. A complex envelope detector as recited in claim 5 wherein said first impedance elements and first rectifier elements comprise resistors and diodes respectively.

7. A complex envelope detector as recited in claim 1 wherein said summing amplifier means comprise second operational amplifier means and second subcircuit means, said second subcircuit means having a plurality of second impedance elements coupled to said rectifier circuit means for receiving rectified voltage signals from said rectifier circuit means, said second impedance elements also coupled to said second operational amplifier means for providing a summed input voltage signal to said second operational amplifier means, said second operational amplifier means multiplying said summed input voltage by a preselected gain.

8. A complex envelope detector as recited in claim 7 wherein said second impedance elements comprise resistors and said gain of second operational amplifier is preselected to provide at the output of said second operational amplifier the weighted average of said summed input voltage signal.

9. A complex envelope detector as recited in claim 1 including first signal inverting means coupled to said input means and also coupled to a preselected translating means for inverting the incoming signal to said preselected translating means.

10. A complex envelope detector as recited in claim 9 wherein said first signal inverting means comprise an operational amplifier.

11. A complex envelope detector as recited in claim 1 further including second signal inverting means coupled to said rectifying circuit means and to said summing amplifier means for inverting the incoming signal to said summing amplifier means.

12. A complex envelope detector as recited in claim 11 wherein said second signal inverting means comprise an operational amplifier.

13. A complex envelope detector as recited in claim 9 wherein said first signal inverting means comprises in combination an operational amplifier coupled to a first translating means said combination coupled to said input means and to said preselected translating means, said combination operable to invert an incoming signal from said input means and provide said inverted signal to said preselected translating means.

14. A complex envelope detector as recited in claim 1 including a plurality of full-wave rectifying means coupled to each other and to said input means and also coupled to preselected translating means and to summing amplifier for forming the electric analog values of said electric signals into given preselected vectors of positive angles between 0° and 90°.

15. A complex envelope detector as recited in claim 14 wherein said full-wave rectifying means comprise a third subcircuit having a half-wave rectifier circuit coupled to an operational amplifier having a gain of at least two.

16. A complex envelope detector as recited in claim 1 including scaling circuit means for normalizing the weighted average of $\hat{R}$, where $\hat{R}$ is the approximate magnitude of the complex vector.

17. A complex envelope detector as recited in claim 3 wherein the preselected multiplier magnitude is the sine of the angle of said preselected vector.

* * * * *